(12) United States Patent
Moidu

(10) Patent No.: US 6,962,338 B2
(45) Date of Patent: Nov. 8, 2005

(54) HERMETIC SEAL AND A METHOD OF MAKING SUCH A HERMETIC SEAL

(75) Inventor: Abdul Jaleel K. Moidu, Ottawa (CA)

(73) Assignee: JDS Uniphase Inc., Ottawa (CA)

(*) Notice: Subject to any disclaimer, the term of this patent is extended or adjusted under 35 U.S.C. 154(b) by 48 days.

(21) Appl. No.: 10/369,663

(22) Filed: Feb. 21, 2003

(65) Prior Publication Data

US 2003/0160398 A1 Aug. 28, 2003

Related U.S. Application Data

(60) Provisional application No. 60/358,350, filed on Feb. 22, 2002.

(51) Int. Cl.$^7$ .................................. E04B 1/682
(52) U.S. Cl. .................. 277/316; 277/637; 277/641; 277/642
(58) Field of Search ................. 277/637, 641, 277/642, 316

(56) References Cited

U.S. PATENT DOCUMENTS

| | | | |
|---|---|---|---|
| 3,215,304 A | * 11/1965 | Rohe | 429/176 |
| 4,474,306 A | * 10/1984 | Nakauchi et al. | 403/375 |
| 4,818,730 A | * 4/1989 | Smith, III et al. | 501/15 |
| 5,024,883 A | 6/1991 | SinghDeo et al. | 428/323 |
| 5,993,931 A | 11/1999 | Grencavich | 428/66.3 |
| 6,229,208 B1 | 5/2001 | Massey et al. | 257/732 |
| 6,306,526 B1 | 10/2001 | Yamamoto et al. | 428/645 |
| 6,352,195 B1 | 3/2002 | Guthrie et al. | 228/123.1 |
| 6,413,800 B1 | 7/2002 | Kyle | 438/115 |
| 6,564,531 B2 | * 5/2003 | Beck | 53/478 |

* cited by examiner

Primary Examiner—Enoch Peavey
(74) Attorney, Agent, or Firm—Teitelbaum & MacLean; Neil Teitelbaum; Doug MacLean

(57) ABSTRACT

The invention provides a hermetic seal and a method of making a hermetic seal having the steps of providing a first member of a first material having a flange thereon, providing a second member of a second material having a slot thereon for accommodating the flange in said slot such that there is a gap between the slot and the flange, providing a sealant in the slot, and heating the sealant such that the sealant fills at least a portion of the gap between the flange and the slot for forming a hermetic seal therebetween. Advantageously, the slot and flange design of the inventive hermetic seal produces a three-dimensional compressive state of stress thereby providing a joint design of improved reliability.

9 Claims, 3 Drawing Sheets

HERMETIC SEAL AND A METHOD OF MAKING SUCH A HERMETIC SEAL

CROSS-REFERENCE TO RELATED APPLICATIONS

This application claims priority of U.S. Provisional Patent Application No. 60/358,350 filed on Feb. 22, 2002, entitled "A Generic Joint Design For Hermetic Seals in Electro-Optical Devices" which is incorporated herein by reference for all purposes.

MICROFICHE APPENDIX

Not Applicable

FIELD OF THE INVENTION

The present invention generally relates to the field of hermetic seals and sealing.

BACKGROUND OF THE INVENTION

Optical devices are used in a wide variety of applications ranging from telecommunications to medical technology.

It is desirable to hermetically seal optical devices to prevent deterioration in performance due to moisture and other species present in the atmosphere. Furthermore, it is desirable to improve the reliability of hermetically sealed optical devices.

A perennial problem has been that stresses originating from thermal expansion, thermal gradients, the device's mounting process, or other causes can cause seal failure or even complete or partial detachment of hermetically sealed components in an optical device.

In hermetically sealing a lid to a package using a soldering process, it is common practice to use an overlap joint, such as shown in FIGS. 1a and 1b, or a variation thereof. FIG. 1a shows a schematic presentation of a prior art hermetically sealed device wherein an overlap joint is provided by sealing a box 110 with a solder 120 to a lid 130. FIG. 1b is a close-up view of Section A of FIG. 1a showing in more detail the overlap joint between planar surfaces of box 110 and lid 130 by means of solder 120. Furthermore, it is noted, that with such overlap joints, it is possible to achieve compressive stresses in the plane of the joint but not in the lateral direction. The presence of compressive stress in the lateral direction of the joint will improve the toughness of the joint and thereby enhance its reliability.

Consequently, since such prior art soldering techniques between a lid and a package make use of planar surfaces, the stress forces lie in a two-dimensional plane. Therefore, there is a need for hermetically sealed devices wherein the stress forces act in three dimensions. The advantages of such designs are increased reliability and a greater range of materials that can be used in making the solder joint.

It is an object of this invention to provide a hermetic seal with improved reliability.

Another object of this invention is to provide a hermetic seal comprising a three-dimensional state of compressive stresses.

A further object of the invention is to provide a method of making such an improved hermetic seal.

SUMMARY OF THE INVENTION

In accordance with the invention there is provided, a method of making a hermetic seal comprising the steps of (a) providing a first member of a first material having a flange thereon; (b) providing a second member of a second material having a slot thereon for accommodating the flange in said slot such that there is a gap between the slot and the flange; (c) providing a sealant in the slot; and (d) heating the sealant such that the sealant fills at least a portion of the gap between the flange and the slot for forming a hermetic seal therebetween. In accordance with an embodiment of the invention, the hermetic seal comprises compressive forces in a three-dimensional state aside from adhesion.

In accordance with a further embodiment of the invention, the method further includes the step of placing the sealant and the first and the second member in an oxygen-reduced environment prior to performing step (d). The oxygen-reduced environment can be provided, for example, by means of a vacuum or an inert atmosphere. Helium and nitrogen are possible gases for use as an inert atmosphere.

In accordance with yet a further embodiment of the invention, the sealant is a solder material. Exemplary materials for use as a solder material are metal wire, alloys, or glass solder.

In another embodiment of the present invention, the first material and the second material are the same material.

In accordance with the invention, there is further provided, a method of making a hermetic seal comprising the steps of providing a first package member comprising a flange, providing a second package member comprising a slot for accommodating the flange such that there is a gap between said flange and said slot, providing a sealant in at least one of the flange and the slot, heating the sealant for filling at least a portion of the gap between the flange and the slot to provide the hermetic seal between the flange and the slot, and waiting for the temperature of the sealant to change for allowing the sealant to solidify.

In a further embodiment of the invention, the method comprises the further step of controlling a sealing rate by controlling a temperature change during the step of heating the sealant.

In accordance with another aspect of the invention, there is provided, a hermetic seal comprising a first package member comprising a first material having a flange; a second package member comprising a second material having a slot, said slot for accommodating said flange such that there is a gap between the flange and the slot; a sealant provided in the slot for at least partially filling the gap between the slot and the flange. If desired, the first package member is a lid and the second package member is a package, or vice versa.

In accordance with another embodiment of the invention, the first and the second package member are made of the same material. This is advantageous in reducing a distortion of hermetically sealed assemblies.

In accordance with an embodiment of the invention, the first and the second package member are made of aluminum Advantageously, hermetic seals of the present invention have many potential applications for hermetic sealing of lids, hermetic fiber or electrical assemblies, or other attachments to an otherwise hermetic package. The slot and flange design of the present invention produces a three-dimensional compressive state of stress in the joint to provide a more reliable joint. Another advantage of the inventive joint design is the provision of low cost hermetic packaging, such as aluminum housings, as well as multi-fiber ribbon feedthroughs.

BRIEF DESCRIPTION OF THE DRAWINGS

Exemplary embodiments of the invention will now be described in conjunction with the following drawings wherein like numerals represent like elements, and wherein:

FIG. 1b is a close-up view of Section A of FIG. 1a;

DETAILED DESCRIPTION OF THE PREFERRED EMBODIMENTS

The present invention provides a hermetic seal and a method of making such a hermetic seal which is under compressive stress in three dimension. This enables the provision of hermetic seals with improved reliability for packages containing optical components. However, the present invention is not intended to be limited to hermetic seals in optical devices but can be employed in a variety of devices requiring hermetic seals, such as electric or electro-optic assemblies.

In accordance with the present invention, a slot and flange joint design is provided that produces a three-dimensional state of compressive stress in the joint with a proper choice of materials to hermetically seal lids, hermetic fiber or electrical assemblies, or other attachments to an otherwise hermetic package.

Figure 2A:
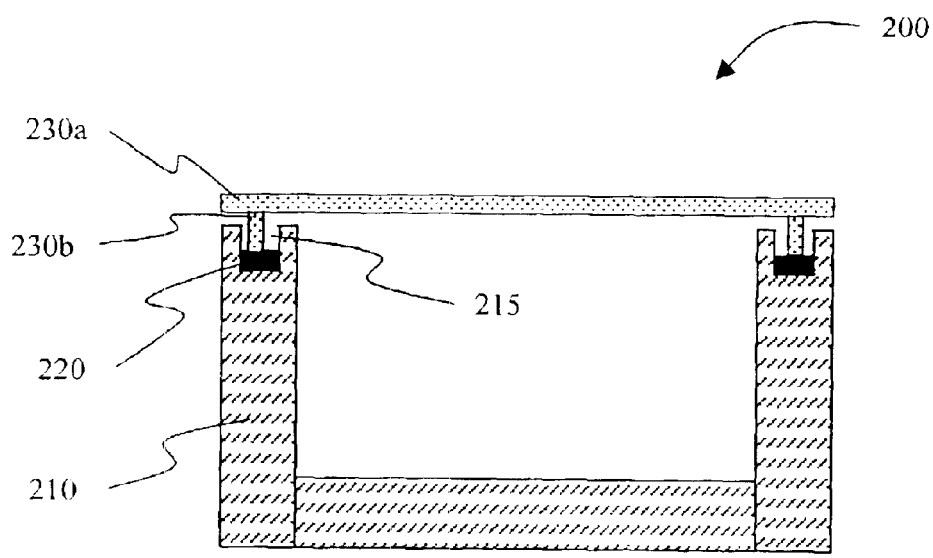
FIG. 2a shows a schematic cross-sectional presentation of a package in accordance with the invention before a hermetic seal is provided.
Figure 2B:
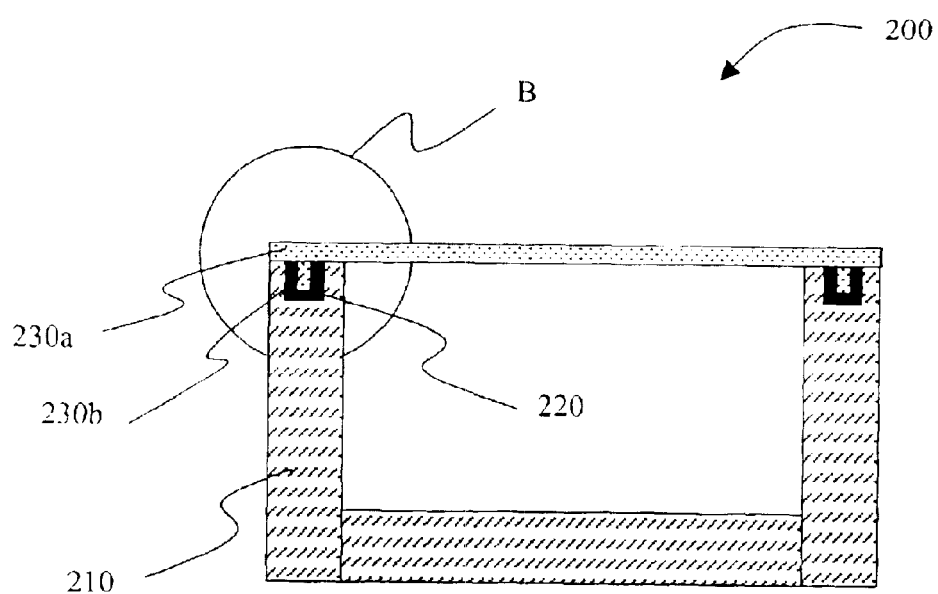
FIG. 2b shows a schematic cross-sectional presentation of a package in accordance with the invention after a hermetic seal is provided.
Figure 2C:
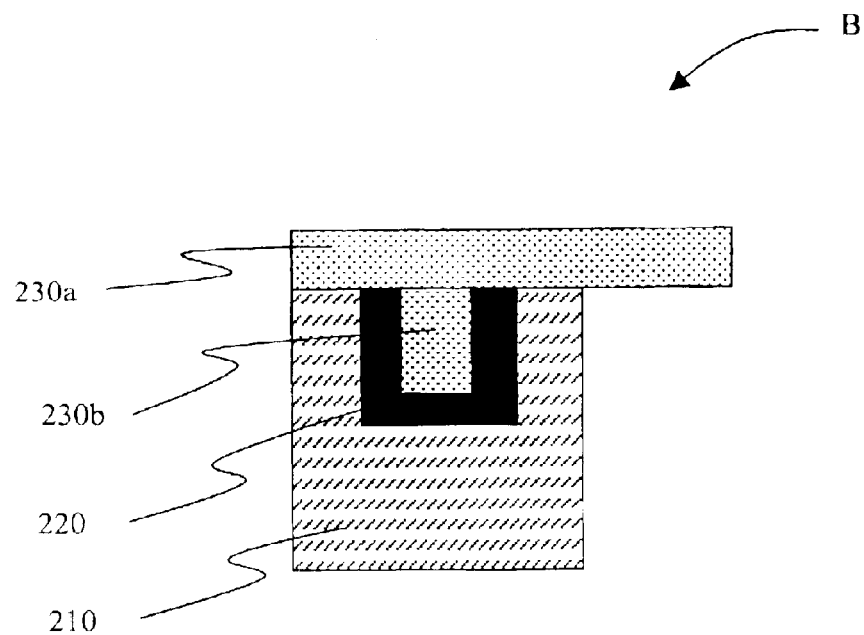
FIG. 2c is a close-up view of Section B of FIG. 2b.

FIG. 2a shows a schematic cross-sectional presentation of a package 200 before a hermetic seal is provided between a box 210 and a lid 230a. Box 210 includes a slot 215 and lid 230a includes a flange 230b. A sealant 220, such as a solder preform, is provided in slot 215. The lid 230a is then placed in the slot 215 on top of the solder 220. As can be seen from FIG. 2a, the dimensions of the slot are such that the flange fits into the slot with a gap remaining between slot 215 and flange 230b. If desired, the slot and the flange positions are reversed, provided that material and geometrical requirements are met. The assembly is then heated so that the solder preform in slot 215 begins to melt. As the solder preform melts, the flange 230b of lid 230a moves downwards in slot 215 until it settles in slot 215 of package 200. Once the flange is settling in the slot, the heater can be removed. The package 200 is allowed to cool so that the solder solidifies, thereby providing a hermetic seal between the flange and the slot. This is shown in more detail in conjunction with FIG. 2b presenting a schematic cross-sectional view of a hermetically sealed device in accordance with the present invention. Lid 230a including flange 230b is sealed to a box 210 by means of a sealant 220 in slot 215. FIG. 2c presents a close-up view of section B of FIG. 2b showing in more detail the hermetic seal between slot 215 and flange 230b by means of sealant 220. Such a joint achieves compressive stresses in the plane of the joint and also in the lateral direction. The presence of a three-dimensional state of compressive stress, in addition to adhesion between the various materials, can improve the toughness of the joint and thereby enhance the reliability of the hermetic seal.

In accordance with another embodiment of the invention, the materials of the package, e.g. lid and box, are chosen to be the same so as to reduce a distortion of the hermetically sealed package.

Figure 1A:
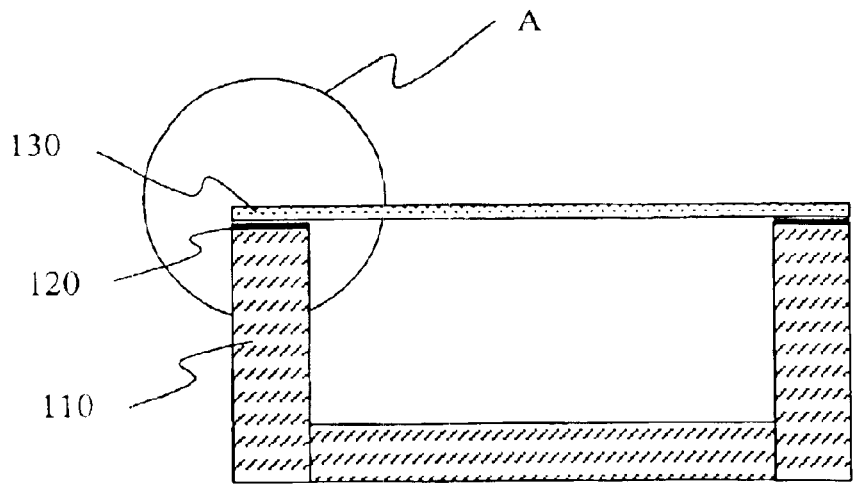
FIG. 1a shows a schematic presentation of a prior art hermetically sealed device having an overlap joint between planar surfaces.
Figure 1B:
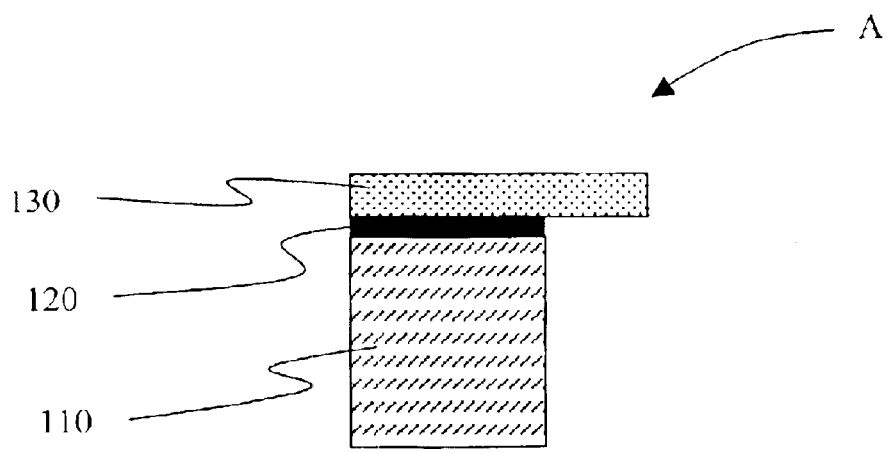

As discussed heretofore, in hermetically sealing a lid to a package using a soldering process, it is common practice in the prior art to use an overlap joint (FIG. 1a and FIG. 1b) or a variation thereof. The mismatch in the coefficient of thermal expansion (CTE) of a solder material and package material(s) causes interfacial shear and peeling stresses at the edge of the joint after cool-down to room temperature and/or temperature cycling. The toughness of the joining material and an interfacial adhesion is crucial in achieving a hermetically sealed device of good reliability.

With the slot and flange joint design of the present invention, a three-dimensional state of compressive stress can be achieved in at least part of the joint by appropriate material selection. An important consideration for such a joint design is the coefficient of thermal expansion(CTE). The presence of compressive stresses in the plane of the joint as well as lateral compressive stresses in the joint, on top of adhesion between the various materials, will improve the toughness of the joint, thereby enhancing the reliability of the hermetic seal.

In accordance with another embodiment of the invention, such joint designs are not limited to lid/package sealing, but are applicable to various hermetic attachments, such as sealing a hermetic fiber or electric feedthrough assembly.

The material property and geometrical requirements for producing three-dimensional compressive stresses in a slot/flange joint are discussed below.

The parameters are the dimensions of the slot and flange, the coefficients of thermal expansion (CTE) of the lid and package material and the solder, and the volume expansion of the solder that may occur on solidification. Since the joint/hermetic seal has a three-dimensional shape, the stress forces in the joint are also in three dimensions.

Figure 3:
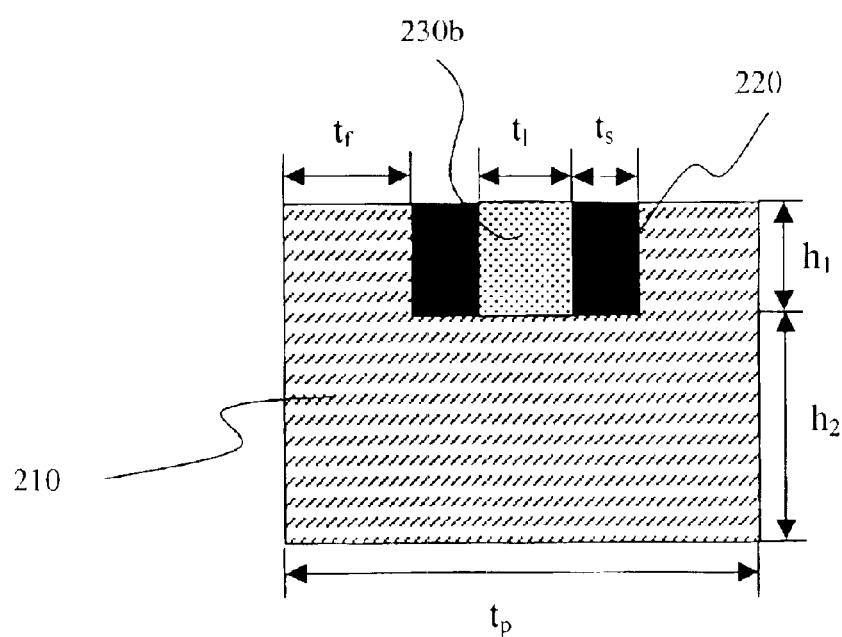
FIG. 3 shows a schematic cross-sectional presentation of a flange and slot geometry of the hermetic seal in accordance with the invention for an analysis of material and geometry requirements.

FIG. 3 shows a schematic cross-sectional presentation of a flange and slot geometry of the hermetic seal in accordance with the invention for an analysis of material and geometry requirements.

For reasons of clarity, the flange/slot geometry is idealized as presented in FIG. 3. In the following discussion, E is modulus of elasticity, $\Delta T$ is the difference between the soldering temperature and room temperature (or lowest operating temperature), $\alpha$ is the CTE, $\delta$ is the linear expansion of the solder upon solidification if any. The subscripts p, l and s represent the package, lid and the slot, respectively. The following 3 cases are considered.

Case 1: When the package and the lid are made of the same materials (an advantageous scenario), and there is no volume expansion, $\delta$, of solder upon solidification, the criterion for compressive seal is simply:

$$\alpha_p > \alpha_s \quad \text{Eq. (1)}$$

For example, this condition can be satisfied with:
1. Relatively high expansion metals (e.g. Aluminum, Brass, Copper) with relatively low expansion solders (e.g. 10Au/90Sn, 20Au/80Sn).
2. Glass solders are available in a wide range of CTE (4 to 12 ppm/C), opening up the possibility of using metals with medium CTE values (e.g. stainless steel).

Case 2: The package and lid are again of the same materials, but use a solder that expands upon solidification. The criterion for compressive seal is then:

$$(\alpha_p - \alpha_s)\Delta T + \delta > 0 \quad \text{Eq. (2)}$$

This opens up the possibility of using a solder that has higher CTE than metal, but expands upon freezing. One possible solder is 58Bi42Sn which has an approximate ~0.25% linear expansion upon solidification. In principle, medium expansion alloys, such as 400 series stainless steel, can be used for the package/lid.

Case 3: Finally, the following relationships hold under the general case of differing package and lid materials as well as finite expansion of the solder.

$$2t_s\Delta T((\alpha_p-\alpha_s))+t_l(\alpha_p-\alpha_l)+2t_s\delta>0 \quad \text{Eq. (3a)}$$

$$(E_p 2t_l(\alpha_p-\alpha_s)+t_l E_l(\alpha_l-\alpha_s))\Delta T+\delta(2t_l E_p+t_l E_l)>0 \quad \text{Eq. (3b)}$$

This provides more flexibility in the joint design since the geometry and CTE of the package and lid can be chosen appropriately. Again, glass solders and a range of metal solders or alloys may be used.

EXAMPLE

An aluminum package-to-lid seal using a BiSn solder material is achieved. The method of providing a hermetic seal between the lid and the package involves the use of a solder preform (two stacked wires of 0.035" diameter) which are places in the slot of the base of the package. The lid is in turn placed on top of the solder wire.

The assembly is then placed in a vacuum chamber, evacuated and heated to about 160° C. (the solder material melts at about 140° C.). As the solder wire starts to melt, the lid moves down slowly until it settles completely in the slot on the package at which moment the heater is turned off. The sealed package is removed and allowed to cool in the air. This method was used to seal Al packages of the following dimensions 2" by 1" and 11" by 6". The sealed Al packages were subsequently subjected to sequential thermal, temperature cycling, and damp/heat tests. The hermetically sealed packages successfully passed hermeticity specifications (5e-9 atm.cc/sec. for 10% He content).

It was found that the above mentioned lid movement is important in achieving good wetting of the solder to the substrates. In the exemplary design—1.1 mm wide by 2.4 mm deep slot, and 2.2 mm by 0.6 mm flange—a movement of about 1.5 mm was found to be sufficient to achieve a good seal. It is thought that this movement of the lid causes the breakdown of the surface oxide layer that was present on the solder wire and thereby exposing virgin solder.

In accordance with another embodiment of the present invention, an oxygen-reduced environment is advantageous during the heating/sealing step of the solder material. An oxygen-reduced environment reduces an oxidation of the solder material at the relatively high temperature to melt the solder. Tests were performed to provide hermetic sealing of packages in an inert atmosphere or a vacuum. For example, a glove box was used to seal packages. The inert atmosphere in the glove box contained 90% nitrogen and 10% helium.

In accordance with a further embodiment of the invention, a localized heater is used in a glove box to implement the above described method of hermetically sealing a package. If desired, the velocity of the lid movement is controlled by external means to control a temperature ramp.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A method of making a hermetic seal comprising the steps of:
   (a) providing a first member of a first material having a flange thereon;
   (b) providing a second member of a second material having a slot thereon for accommodating the flange in said slot such that there is a gap between the slot and the flange;
   (c) providing a sealant in the slot;
   (d) placing the sealant and the first and the second member in an oxygen-reduced environment, and subsequently heating the sealant such that the sealant fills at least a portion of the gap between the flange and the slot for forming the hermetic seal therebetween while controlling a relative movement between the flange and the slot for promoting a wetting of the sealant to the flange and the slot, wherein the hermetic seal comprises compressive stresses.

2. The method as defined in claim 1 wherein the oxygen-reduced environment is one of a vacuum and an inert atmosphere.

3. A method of making a hermetic seal comprising the steps of:
   (a) providing a first member of a first material having a flange thereon;
   (b) providing a second member of a second material having a slot thereon for accommodating the flange in said slot such that there is a gap between the slot and the flange;
   (c) providing a sealant in the slot, wherein the sealant is a solder material;
   (d) heating the sealant such that the sealant fills at least a portion of the gap between the flange and the slot for forming the hermetic seal therebetween while controlling a relative movement between the flange and the slot for promoting a wetting of the sealant to the flange and the slot, wherein the hermetic seal comprises compressive stresses.

4. The method as defined in claim 3 wherein the solder material is one of a metal wire, an alloy, and a glass solder.

5. A method of making a hermetic seal comprising the steps of:
   providing a first package member comprising a flange;
   providing a second package member comprising a slot for accommodating the flange such that there is a gap between said flange and said slot;
   providing a sealant in at least one of the flange and the slot;
   heating the sealant for filling at least a portion of the gap between the flange and the slot to provide the hermetic seal between the flange and the slot;
   controlling a sealing rate by controlling a temperature change during the step of heating the sealant; and
   waiting for the temperature of the sealant to change for allowing the sealant to solidify.

6. A method of making a hermetic seal comprising the steps of:
   (a) providing a first member of a first material having a flange thereon;
   (b) providing a second member of a second material having a slot thereon for accommodating the flange in said slot such that there is a gap between the slot and the flange;
   (c) providing a sealant in the slot; and (d) heating the sealant such that the sealant fills at least a portion of the gap between the flange and the slot for forming the hermetic seal therebetween, wherein the hermetic seal comprises compressive stresses; and (e) placing the sealant and the first and the second member in an oxygen-reduced environment prior to performing step (d).

7. The method as defined in claim 6 wherein the oxygen-reduced environment is one of a vacuum and an inert atmosphere.

8. A method of making a hermetic seal comprising the steps of:

(a) providing a first member of a first material having a flange thereon;

(b) providing a second member of a second material having a slot thereon for accommodating the flange in said slot such that there is a gap between the slot and the flange;

(c) providing a sealant in the slot; and (d) heating the sealant such that the sealant fills at least a portion of the gap between the flange and the slot for forming the hermetic seal therebetween, wherein the sealant is a solder material, and wherein the hermetic seal comprises compressive stresses.

9. The method as defined in claim 8 wherein the solder material is one of a metal wire, an alloy, and a glass solder.

* * * * *